(12) United States Patent
Yoneyama et al.

(10) Patent No.: US 9,246,805 B2
(45) Date of Patent: Jan. 26, 2016

(54) COMMUNICATION STATION, COMMUNICATION CONTROL PROGRAM, AND COMMUNICATION NETWORK SYSTEM

(71) Applicant: KABUSHIKI KAISHA TOSHIBA, Minato-ku, Tokyo (JP)

(72) Inventors: Seijiro Yoneyama, Kanagawa-ken (JP); Takahiro Kobayashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

(21) Appl. No.: 13/766,873

(22) Filed: Feb. 14, 2013

(65) Prior Publication Data

US 2013/0259054 A1    Oct. 3, 2013

(30) Foreign Application Priority Data

Mar. 29, 2012 (JP) ................................. 2012-076976

(51) Int. Cl.
| | |
|---|---|
| H04L 12/28 | (2006.01) |
| H04L 12/741 | (2013.01) |
| H04L 12/26 | (2006.01) |
| H04L 12/721 | (2013.01) |

(52) U.S. Cl.
CPC ............ *H04L 45/74* (2013.01); *H04L 43/0811* (2013.01); *H04L 45/12* (2013.01)

(58) Field of Classification Search
USPC .......................... 370/221, 254, 351, 392, 400
See application file for complete search history.

(56) References Cited

U.S. PATENT DOCUMENTS

| | | | | |
|---|---|---|---|---|
| 7,987,286 | B1 * | 7/2011 | Dave | 709/236 |
| 2005/0053016 | A1 * | 3/2005 | Kawai et al. | 370/254 |
| 2007/0217422 | A1 * | 9/2007 | Mawatari et al. | 370/392 |
| 2007/0245034 | A1 * | 10/2007 | Retana et al. | 709/238 |
| 2010/0260146 | A1 * | 10/2010 | Lu | 370/331 |
| 2010/0271960 | A1 * | 10/2010 | Krygowski | 370/248 |
| 2011/0032842 | A1 * | 2/2011 | Patil et al. | 370/254 |

FOREIGN PATENT DOCUMENTS

| | | |
|---|---|---|
| JP | 2005-086337 | 3/2005 |
| JP | 2009-206845 | 9/2009 |

OTHER PUBLICATIONS

Duffy et al, IETF, Protocol for Carrying Authentication for Network Access (PANA) Relay Element, Aug. 2011.
Winter et al, IETF, IPv6 Routing Protocol for Low-Power and Lossy Networks, Mar. 2012.
Office Action of Notification of Reason for Rejection for Japanese Patent Application No. 2012-076976 Dated Apr. 18, 2014, 4 pgs.

* cited by examiner

*Primary Examiner* — Awet Haile
(74) *Attorney, Agent, or Firm* — Amin, Turocy & Watson, LLP

(57) ABSTRACT

There is provided with a communication station including: a receiving unit, a determining unit, a transmitting unit and a reachability testing unit wherein the receiving unit receives a packet from a network in which a plurality of communication stations are interconnected, the determining unit determines whether the receiving unit receives a first packet in which a transmission source address is an address of a first communication station, the transmitting unit transmits a reply request packet to request a reply to the first communication station, and the reachability testing unit omits for the transmitting unit to transmit the reply request packet when the first packet is received before the transmitting unit transmits the reply request packet.

10 Claims, 20 Drawing Sheets

| NODE | FILTER DETERMINATION ADDRESS |
|---|---|
| D | MAC ADDRESS OF B |
| E | MAC ADDRESS OF B |
| F | MAC ADDRESS OF C |

FIG. 4

| NODE | FILTER DETERMINATION ADDRESS (1) | FILTER DETERMINATION ADDRESS (2) |
|---|---|---|
| D | MAC ADDRESS OF B | IP ADDRESS OF A |
| E | MAC ADDRESS OF B | IP ADDRESS OF A |
| F | MAC ADDRESS OF C | IP ADDRESS OF A |

FIG. 10

COMMUNICATION STATION, COMMUNICATION CONTROL PROGRAM, AND COMMUNICATION NETWORK SYSTEM

CROSS REFERENCE TO RELATED APPLICATIONS

This application is based upon and claims the benefit of priority from the prior Japanese Patent Application No. 2012-76976, filed on Mar. 29, 2012, the entire contents of which are incorporated herein by reference.

FIELD

Embodiments relate to a communication station, a computer readable medium storing a communication control program, and a communication network system.

BACKGROUND

In recent years, the Internet Engineering Task Force (IETF) has actively developed an IPv6 routing protocol for low power and lossy networks (RPL) as a communication scheme dedicated for a sensor network.

The RPL is a protocol that automatically forms an optimum route used for a communication channel based on wireless propagation routes between nodes connected in a meshed shape (network shape). Communication data is transmitted to reach a destination along a multi-hop route in a bucket relay scheme along an optimum route derived by the RPL by each node. In general, since a radio wave reach distance is physically restricted due to an antenna performance, a radio wave output value, an obstacle object, or the like, the communication range of a wireless station is restricted to a neighboring node with which the wireless station can directly communicate. However, in a wireless meshed network scheme, each node actions as a relay station of the neighboring nodes. Therefore, it is possible to obtain the characteristics in which communication with a wide-range node regardless of restriction on the radio wave reach distance is enabled.

In the RPL, priorities (ranking value) of all routes that become selection candidates are calculated based on a determination criterion (metric) defined in advance. The higher the priority of a route is, the smaller a calculated ranking value is. Therefore, the route with the smallest ranking value is selected as the optimum route. A criterion utilized as the metric has currently been discussed. As the candidates of the criterion, the number of hops indicating a meshed configuration scale, a signal intensity and a packet retransmission ratio each indicating a wireless propagation route quality, a transmission rate and a sleep state each indicating availability of a relay node, and the like have been enumerated.

In general, when the quality of a wireless propagation route is comprehended, combination of both the signal intensity and the packet retransmission ratio is recommended to improve reliability. As a specific method, a method of periodically performing a reachability test on nodes on a route and actively monitoring the signal intensity and the packet retransmission ratio has been generalized.

As described above, the method of periodically performing a reachability test on nodes on a route and actively monitoring the signal intensity and the packet retransmission ratio has been generalized to comprehend to the quality of a wireless propagation route. However, when the reachability test is introduced, the amount of control packet increases and consumption of wireless resources may thus increase. In particular, in a large-scale meshed network environment, it is necessary to perform confirming reachability to nodes on all of the routes which become alternative candidates. Further, in wireless communication at a narrow portable region at which a 900 MHz band or the like is used, an available band is short and a negative effect may be serious.

BRIEF DESCRIPTION OF THE DRAWINGS

FIG. 4 is a diagram illustrating an example of a filter determination address according to the first embodiment;

FIG. 10 is a diagram illustrating an example of a filter determination address according to the third embodiment;

DETAILED DESCRIPTION

According to some embodiments, there is provided with a communication station including: a receiving unit, a determining unit, a transmitting unit and a reachability testing unit.

The receiving unit receives a packet from a network in which a plurality of communication stations are interconnected.

The determining unit determines whether the receiving unit receives a first packet in which a transmission source address is an address of a first communication station.

The transmitting unit transmits a reply request packet to request a reply to the first communication station.

The reachability testing unit omits for the transmitting unit to transmit the reply request packet when the first packet is received before the transmitting unit transmits the reply request packet.

Hereinafter, embodiments will be described with reference to the drawings.

Figure 1:
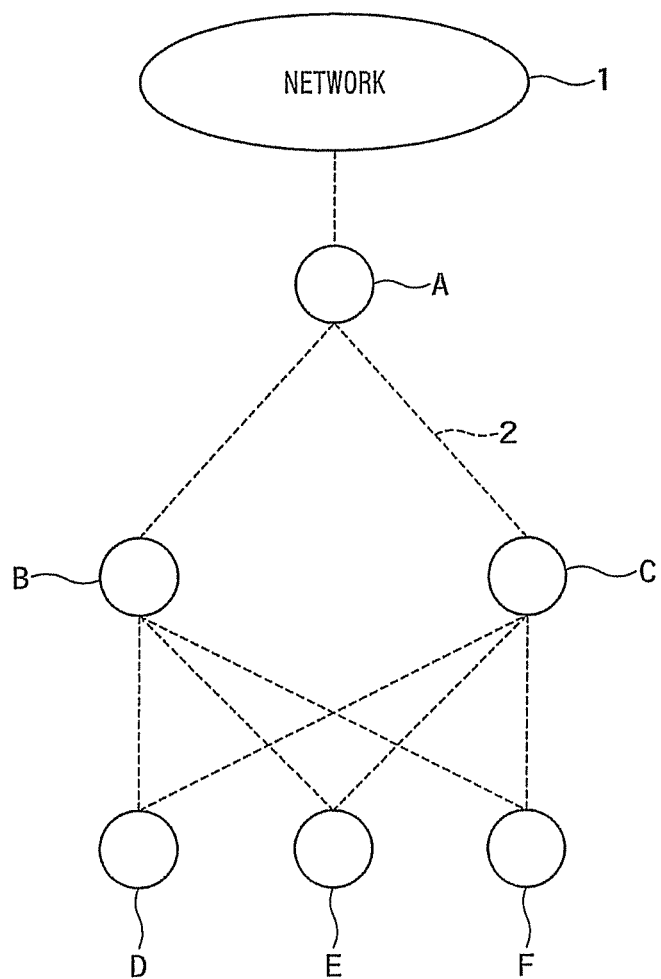
FIG. 1 is a diagram illustrating an example of the configuration of a communication system according to an embodiment.

FIG. 1 is a diagram illustrating an example of the configuration of a communication system according to an embodiment.

In FIG. 1, wireless stations (communication stations) A, B, C, D, E, and F are connected to a network 1, and thus a wireless meshed network is formed. A wireless link 2 indicates a radio wave reach range of each wireless station. For example, the radio wave reach range of the wireless station B is the wireless stations A, D, E, and F. Thus, the wireless station B can communicate with the wireless stations A, D, E, and F. In the example of the configuration of the system in FIG. 1, for example, six wireless stations are configured, but the number of wireless stations equal to or more than six wireless stations or equal to or less than six wireless stations may be configured. In this example, a wireless network is used, but this embodiment can be applied to a network in which communication stations are connected in a wired manner.

Figure 2:
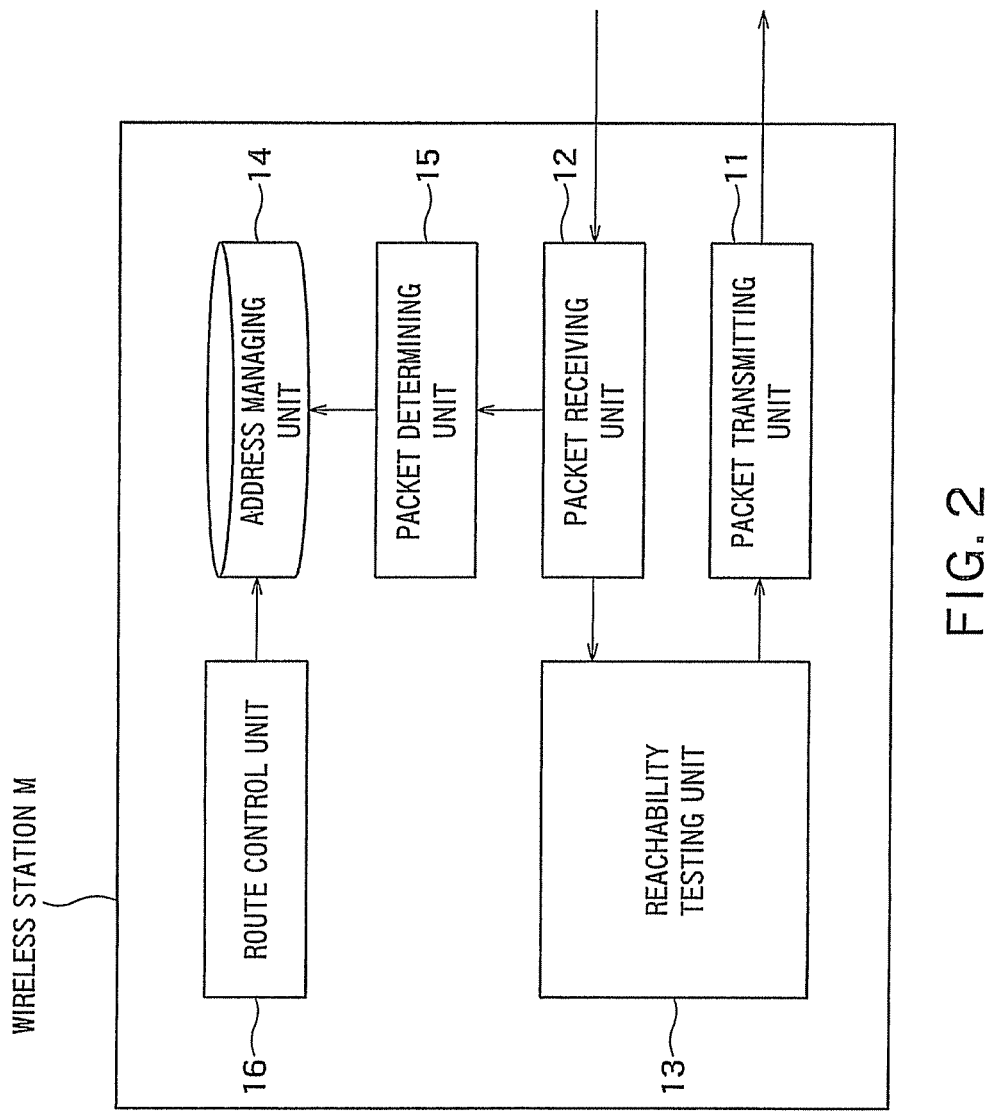
FIG. 2 is a diagram illustrating an example of the configuration of a wireless station according to the embodiment.

FIG. 2 is a diagram illustrating an example of the configuration of the wireless station according to the embodiment. As illustrated in FIG. 2, a wireless station M according to this embodiment includes a packet transmitting unit 11, a packet receiving unit 12, a reachability testing unit 13, an address managing unit 14, a packet determining unit 15, and a route control unit 15.

The packet transmitting unit 11 transmits a packet via a wireless link.

The packet receiving unit 12 receives a packet via a wireless link.

The reachability testing unit 13 tests reachability to another wireless station at a constant period. The wireless station to be tested can be designated according to any method. For example, the wireless station may be an adjacent node on an optimum route determined according to a route control protocol, may be another node within the same network, or may be a node on another network. After the test starts, the reachability testing unit 13 transmits a reply request packet to the wireless station to be tested via the packet transmitting unit 11 at a timing after a constant time (shorter than a period length) or a timing determined with a random number. When a reply packet to the reply request packet is received via the packet receiving unit 12, it is determined that the reachability to the wireless station is good. Here, the test has been carried out at the constant period, but the test may be carried out at a timing designated in advance rather than the periodic timing.

The route control unit 15 performs the route control protocol for a multi-hop wireless link and reflects an address based on a route derived by this protocol on the address managing unit 14.

The address managing unit 14 stores the address based on the route derived by the route control unit 15. Further, the address managing unit 14 stores a filter determination address associated with the characteristics of this embodiment. The filter determination address refers to an address used to determine omission (omission of the transmission of the reply request packet) of the reachability test on a wireless station. The filter determination address includes the address of a wireless station to be subjected to the reachability test. For example, when a wireless station to be tested is an adjacent node on the optimum route, the filter determination address includes the MAC address (or the IP address) of the adjacent node. Alternatively, when a relay node is included between the wireless station and a wireless station to be tested and the relay node is an adjacent node on the optimum route, the filter determination address includes not only the IP address of the wireless station to be tested but also the MAC address of the adjacent node. When an adjacent node is changed through execution of the route control protocol, the route control unit 15 may change (update) the filter determination address of the address managing unit 14 based on the address of the changed adjacent node.

The packet determining unit 15 accurately examines a destination address and a transmission source address of the received packet received by the packet receiving unit 12 and determines that the transmission source address is identical with the filter determination address. When the transmission source address is identical with the filter determination address, the reachability testing unit 13 is notified that the transmission source address is identical with the filter determination address, irrespective of the fact that the destination address is the address of the wireless station itself.

When the reachability testing unit 13 receives a notification from the packet determining unit 15 before the transmission of the reply request packet, the reachability test (the transmission of the reply request packet) at the current period is omitted in that the reachability to the wireless station to be tested can be confirmed. Similarly to the subsequent period, the test is also omitted when the notification is received from the packet determining unit 15 until the transmission of the reply request packet. When the notification is not received, the test is performed. When the test is performed at a timing designated in advance rather than the periodic timing, for example, when the notification is received until a constant time before the transmission timing of the reply request packet, the test may be set to be omitted.

The example in which the constituent elements 11, 12, 13, 14, and 15 are configured as hardware has been described, but the embodiment is not limited thereto. These constituent elements may be configured so that the functions thereof may be provided as software (program) to be executed on the wireless station M. Further, the software (program) may be recorded in a computer-readable recording medium such as a hard disk, a memory device, or a CD-ROM. In this case, the program is read from the recording medium by a computer such as a processor, is loaded on a memory, and is executed.

(First Embodiment)

Hereinafter, a case will be described in which the wireless stations D and E perform the reachability test on the wireless station B and the wireless station F performs the reachability test on the wireless station C according to a first embodiment.

Figure 5:
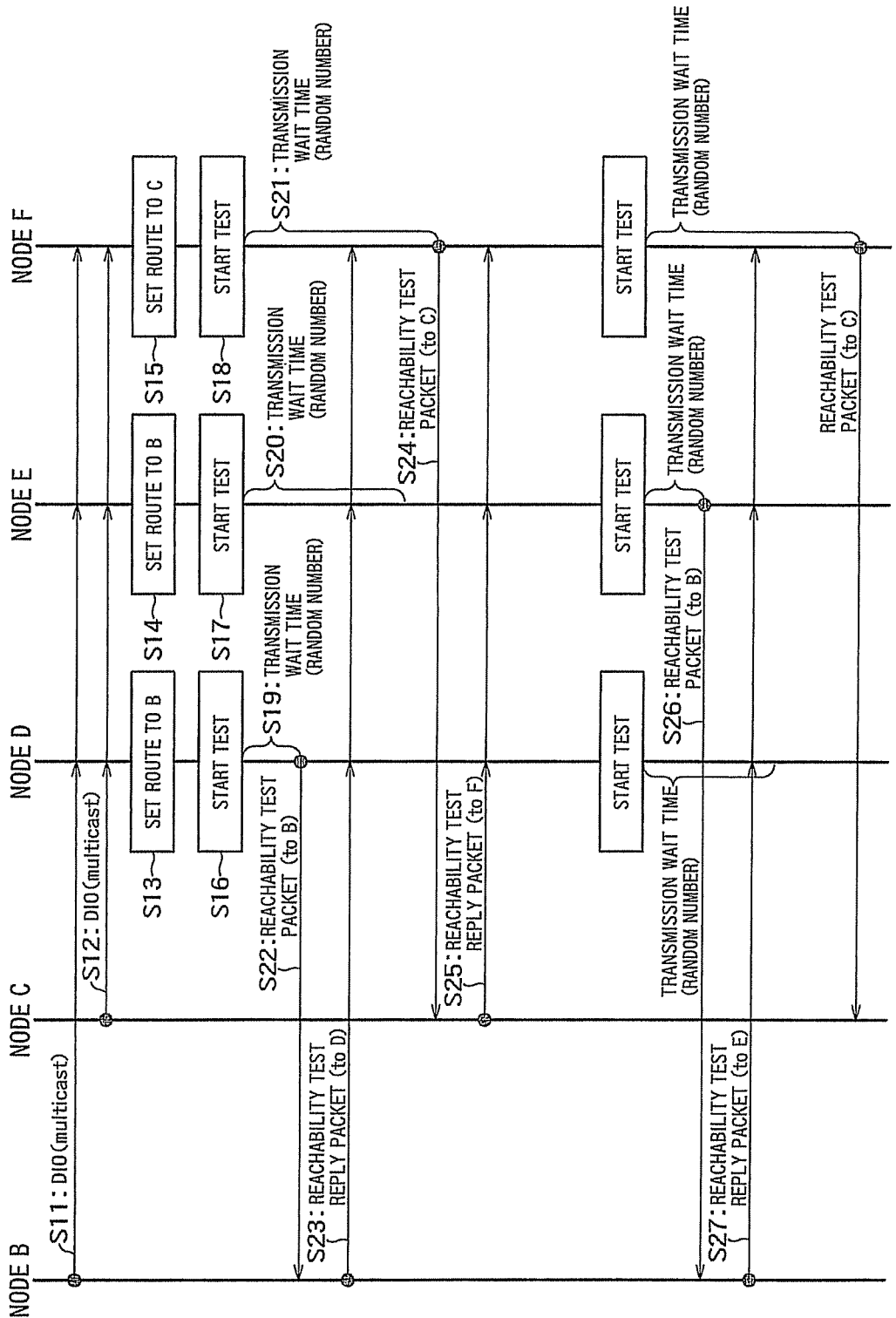
FIG. 5 is a diagram illustrating a sequence according to the first embodiment.

First, as illustrated in FIG. 5, in the initial state, it is assumed that according to an RPL route control protocol (S11 and S12), the wireless stations D and E select the wireless station B as an optimum route and the wireless station F selects the wireless station C as an optimum route (S13, S14, and S15). In the RPL, each node advertises an RPL DODAG information object (DIO) packet and a neighboring node receiving the RPL DIO manages the node as a candidate of the optimum route. Which route is selected as the optimum route is determined based on a metric (in this embodiment, a signal intensity and a packet retransmission ratio) monitored through the reachability test or the like. Priorities (ranking value) of all the routes selected as candidates are calculated based on the metric. Therefore, the route having the smallest ranking value is selected as the optimum route according to a rule in which the higher the priority of the route is, the smaller the calculated ranking value is. In this embodiment, address entries managed by the address managing units 14 of the wireless stations D, E, and F are illustrated in FIG. 4. All of the information illustrated in FIG. 4 may be shared by exchanging information between the wireless stations. Alternatively, the wireless station D may store only the uppermost entry, the wireless station E may store only the second entry, and the wireless station F may store only the third entry. The reachability test is performed by transmitting a reply request packet and receiving a reply packet thereto. For example, ICMP Echo Request can be used as the reply request packet and ICMP Echo Reply can be used as the reply packet. Further, the reachability test is performed at a period managed by each of the wireless stations D, E, and F (S16, S17, and S18). At this time, a timing of the test start of each node may be distributed using a random number (S19, S20, and S21).

Figure 3A:
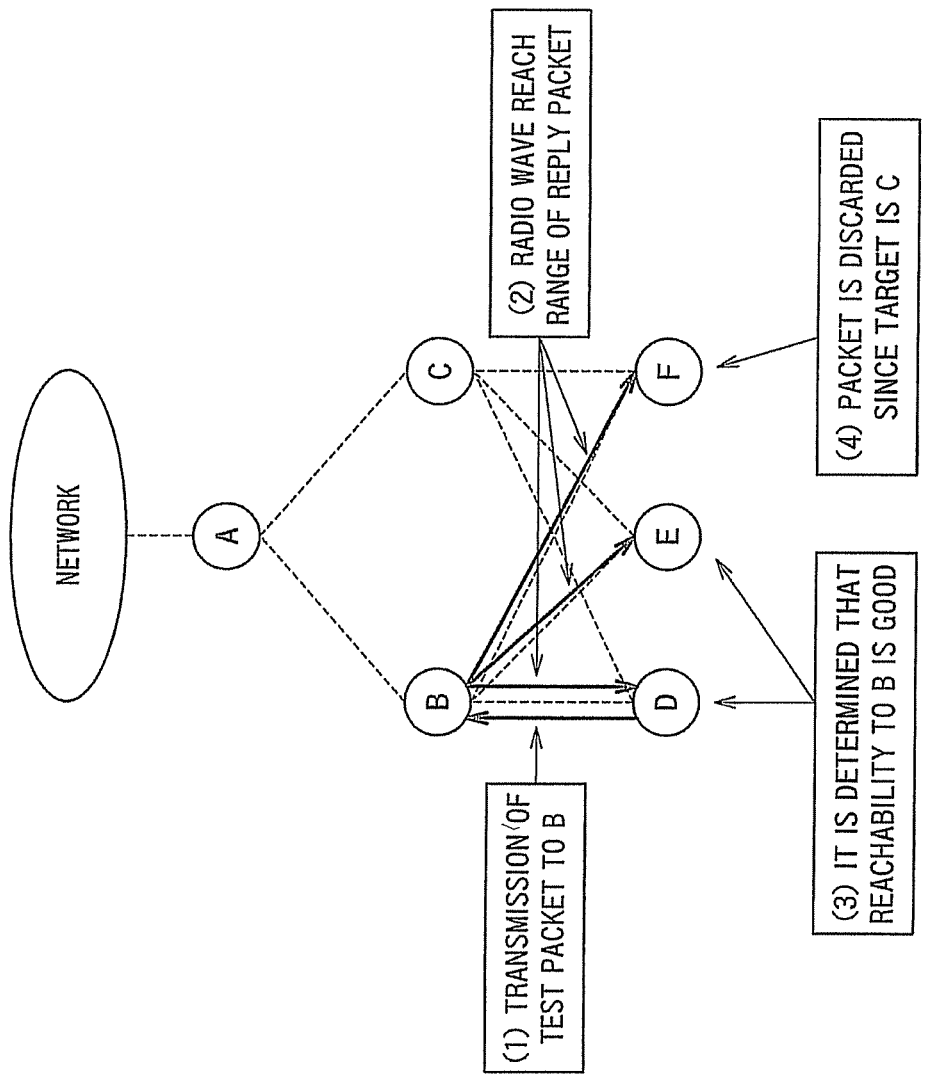
FIG. 3A is a diagram illustrating an operation according to a first embodiment.

First, as illustrated in FIG. 3A, a case is considered in which the wireless station D transmits a reachability test packet to the wireless station B (S22). At this time, a destination address of the reachability test packet is the MAC address of the wireless station B and a transmission source address is the MAC address of the wireless station D. Next, the wireless station B receiving the reachability test packet replies to the reachability test reply packet to the wireless station D (S23). At this time, the destination address of the reachability test reply packet is the MAC address of the wireless station D and the transmission source address is the MAC address of the wireless station B.

Next, the reachability test reply packet is received by the wireless stations D, E, and F, since radio waves transmitted by the wireless station B can reach the wireless stations D, E, and F. At this time, the packet determining units 15 of the wireless stations D and E notify the reachability testing units 13 of the reception of the packets, since the transmission source addresses of the reachability test reply packets are identical with the address entries of FIG. 4 managed by the address managing units 14. Further, the received packet may temporarily be stored in a buffer and may be discarded, when the confirmation of the reachability of the reachability testing unit 13 ends. Further, the packet determining unit 15 of the wireless station F discards the packet without notifying of the reception of the packet, since the transmission source address of the reachability test reply packet is not identical with the address entry of FIG. 4 managed by the address managing unit 14.

Since the wireless stations D and E receive the reachability test reply packet that matches the entry, the reachability testing units 13 each determine that the reachability (connectivity) to the wireless station B is good. The reachability testing unit 13 of the wireless station E cancels the execution of the reachability test at the period, since it is determined that the reachability to the wireless station B is good before the execution of the reachability test.

Figure 3B:
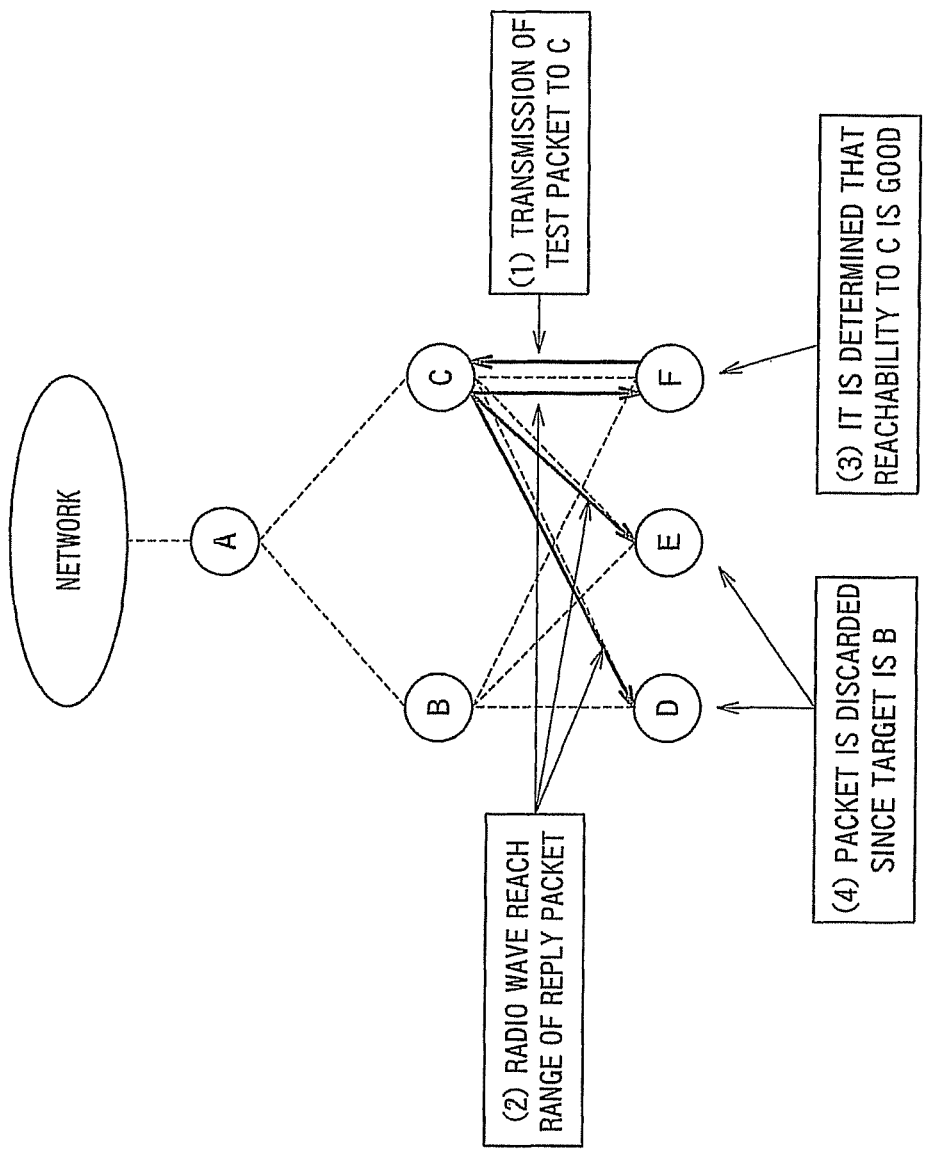
FIG. 3B is a diagram illustrating an operation according to the first embodiment.

Next, as illustrated in FIG. 3B, a case is considered in which the wireless station F transmits a reachability test packet to the wireless station C (S24). At this time, the destination address of the reachability test packet is the MAC address of the wireless station C and the transmission source address is the MAC address of the wireless station F. Next, the wireless station C receiving the reachability test packet replies to the reachability test replay packet to the wireless station F (S25). At this time, the destination address of the reachability test reply packet is the MAC address of the wireless station F and the transmission source address is the MAC address of the wireless station C.

Next, the reachability test reply packet is received by the wireless stations D, E, and F, since radio waves transmitted by the wireless station C can reach the wireless stations D, E, and F. At this time, the packet determining unit 15 of the wireless station F notifies the reachability testing unit 13 of the reception of the packet, since the transmission source address of the reachability test reply packet is identical with the address entry of FIG. 4 managed by the address managing unit 14. Further, the packet determining units 15 of the wireless stations D and E discard the packet, since the transmission source address of the reachability test reply packet is not identical with the address entry of FIG. 4 managed by the address managing unit 14.

Since the wireless station F receives the reachability test reply packet that matches the entry, the reachability testing unit 13 of the wireless station F determines that the reachability to the wireless station C is good.

Figure 3C:
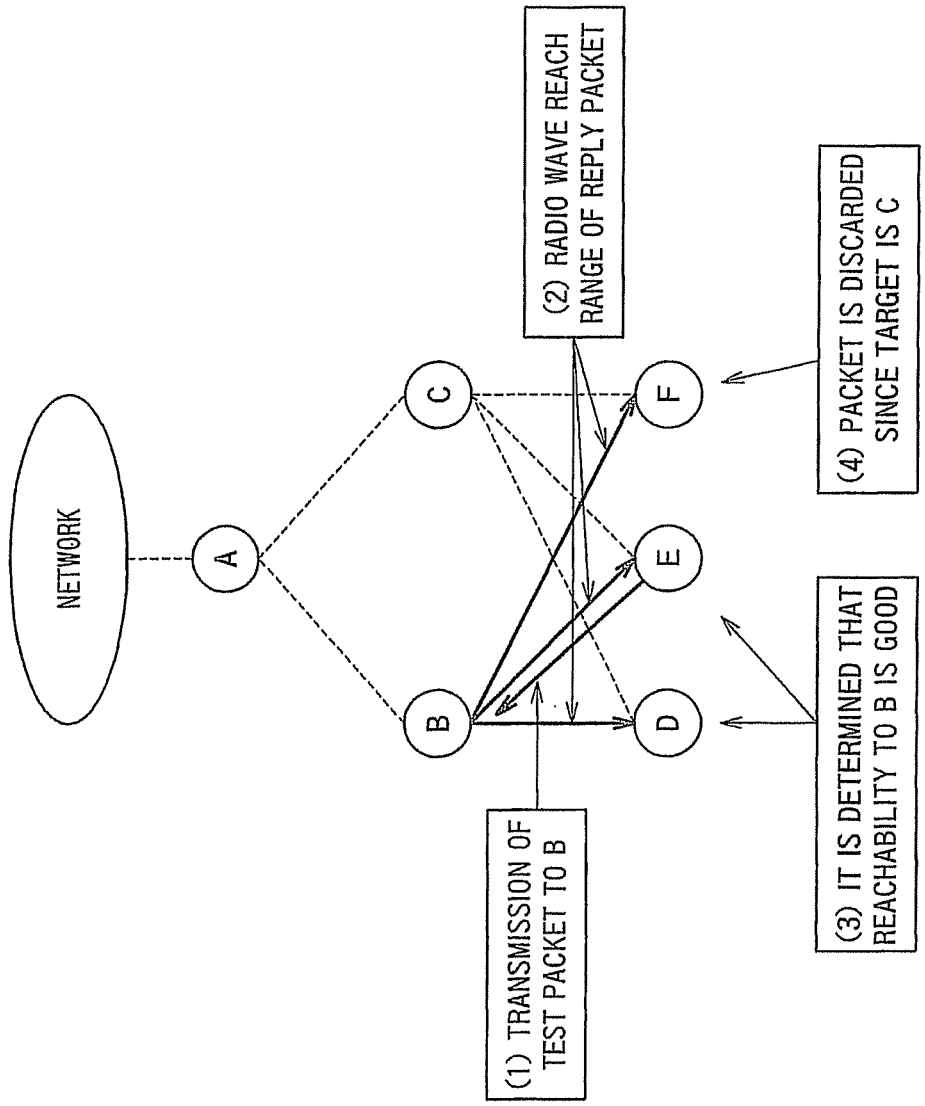
FIG. 3C is a diagram illustrating an operation according to the first embodiment.

Next, as illustrated in FIG. 3C, a case is considered in which the wireless station E transmits a reachability test packet to the wireless station B (S26). At this time, the destination address of the reachability test packet is the MAC address of the wireless station B and the transmission source address is the MAC address of the wireless station E. Next, the wireless station B receiving the reachability test packet replies to the reachability test replay packet to the wireless station E (S27). At this time, the destination address of the reachability test reply packet is the MAC address of the wireless station E and the transmission source address is the MAC address of the wireless station B.

Next, the reachability test reply packet is received by the wireless stations D, E, and F, since radio waves transmitted by the wireless station B can reach the wireless stations D, E, and F. At this time, the packet determining units 15 of the wireless stations D and E notify the reachability testing units 13 of the reception of the packet, since the transmission source address of the reachability test reply packet is identical with the address entry of FIG. 4 managed by the address managing unit 14. Further, the packet determining unit 15 of the wireless station F discards the packet, since the transmission source address of the reachability test reply packet is not identical with the address entry of FIG. 4 managed by the address managing unit 14.

Since the wireless stations D and E receive the reachability test reply packet that matches the entry, the reachability testing units 13 determine that the reachability to the wireless station B is good. The reachability testing unit 13 of the wireless station D cancels the execution of the reachability test at the period, since it is determined that the reachability to the wireless station B is good before the execution of the reachability test.

In the first embodiment, referring to FIGS. 3A, 3B, and 3C, the case has hitherto been described in which the wireless stations D and E perform the reachability test on the wireless station B and the wireless station F performs the reachability test on the wireless station C. Thus, when a plurality of nodes (communication stations) perform the reachability test on the same node and receive the reply packet of the reachability test performed by another node of the nodes, bandwidth consumption is reduced by cancelling the execution of the reachability test of the node itself, and thus the reachability can be confirmed. Further, in this embodiment, the example has been described in which the execution of the reachability test is cancelled in response to the reception of the reachability test reply packet that matches the address entry managed by the address managing unit 14. However, the embodiment is not limited to the reachability test reply packet. The execution of the reachability test may be cancelled in response to the reception of any packet, as long as the packet is a packet that matches the address entry managed by the address managing unit 14. Further, the number of address entries managed by the address managing unit 14 is not necessarily limited to one, but a plurality of address entries may be registered. For example, when an alternative route is present in addition to the optimum route, both the address entries may be registered.

In this embodiment, the ICMP Echo Request packet has been transmitted as the replay request packet to confirm the reachability. However, any test packet may be used, as long as the test packet is a packet configured to confirm the connectivity. For example, the text packet may be a packet for normal data communication or may be a quality measurement packet. The same applies to other embodiments to be described below.

In general, a reply packet replied by unicast communication may not be received by a third-party node, which is not a destination node, due to the specification of PHY and MAC. In general, this is because an address filter function is mounted on the hardware (chip) of PHY and MAC to reduce a reception processing load. Accordingly, in this embodiment, even when the destination address is an address other than the address of the wireless station itself, the address can be preferably configured to be received by the address filter function of the chip of PHY and MAC. The address configured to be received may be any address, may be designated individually, or may be a wild card value. For example, the packet determining unit 15 can be mounted as software of the MAC and IP layers and the reachability testing unit 13 can be mounted as software operating in the application layer.

(Second Embodiment)

In a second embodiment, a case will be described in which the wireless station D changes the optimum route from the wireless station B to the wireless station C according to the RPL route control protocol, the wireless station F performs a reachability test on the wireless station C, and the wireless station E performs a reachability test on the wireless station B after the first embodiment.

Figure 7:
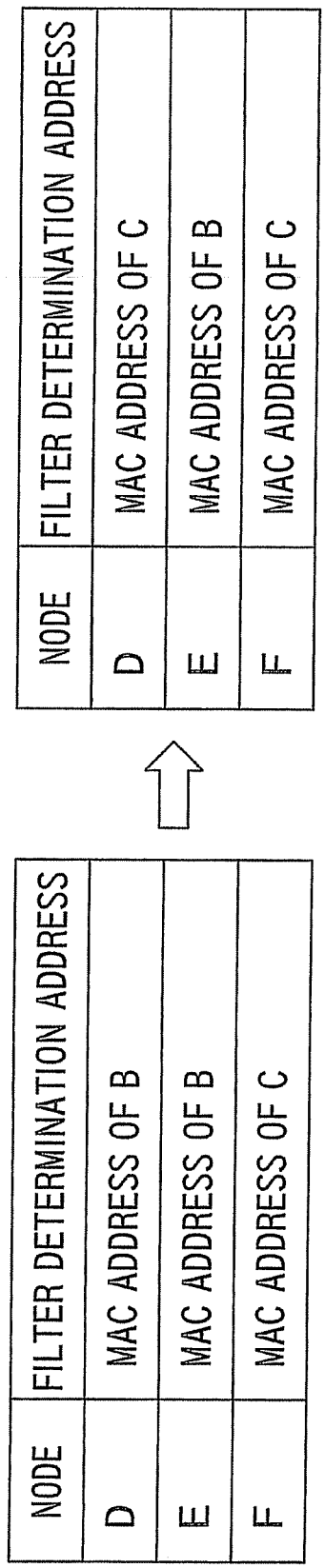
FIG. 7 is a diagram illustrating an example of a filter determination address according to the second embodiment.
Figure 8:
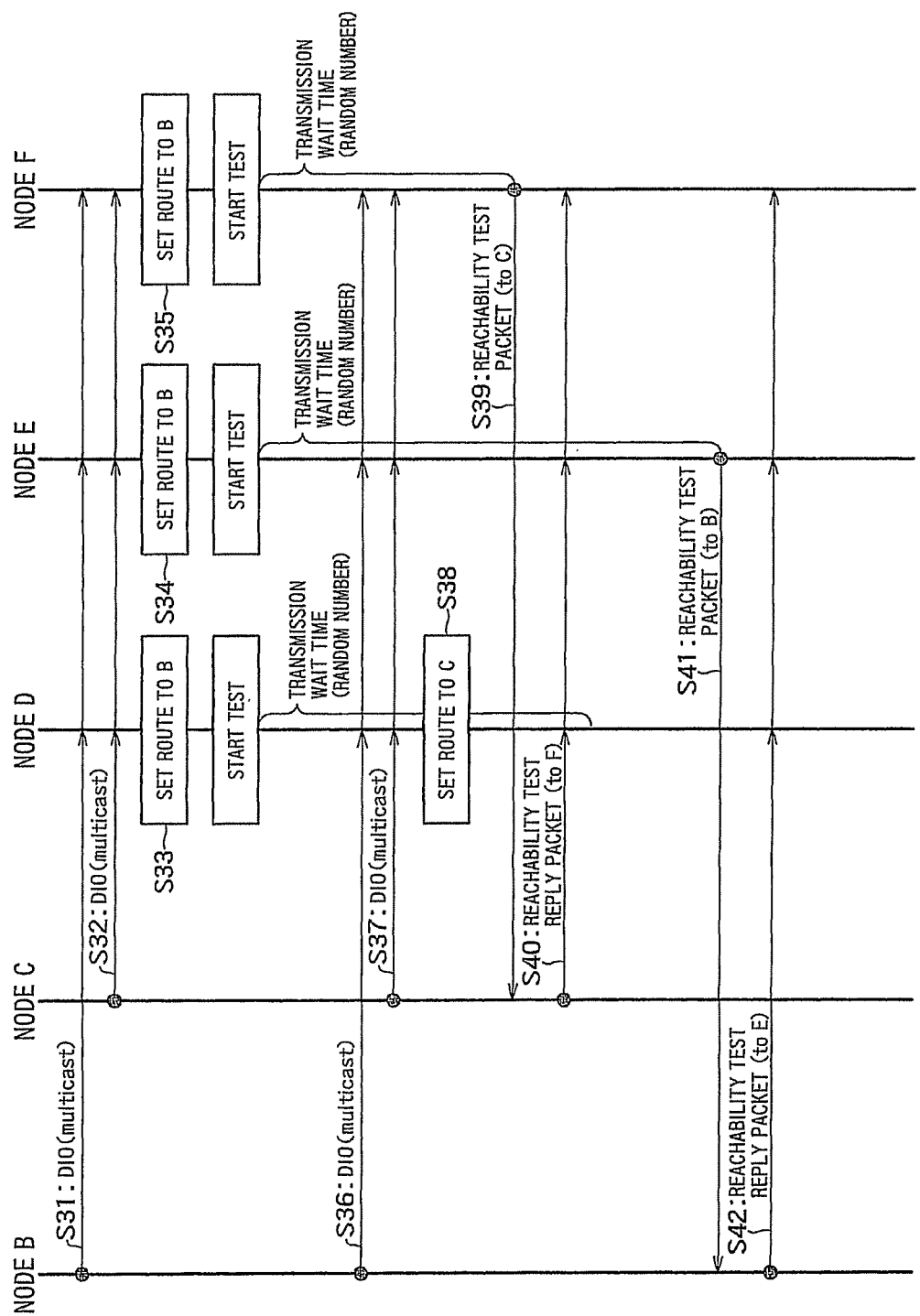
FIG. 8 is a diagram illustrating a sequence according to the second embodiment.

First, as illustrated in FIG. 8, in the initial state, it is assumed that according to an RPL route control protocol (S31 and S32), the wireless stations D and E select the wireless station B as an optimum route and the wireless station F selects the wireless station C as an optimum route as the result of the first embodiment (S33, S34, and S35). Next, the wireless station D receives RPL DIO packets from the wireless stations B and C again (S36 and S37). At this time, it is assumed that the wireless station D recalculates a priority (ranking value) of the routes to the wireless stations B and C and resets the wireless station C as the optimum route (S38). Accordingly, the address entries managed by the address managing units 14 of the wireless stations D, E, and F are illustrated in FIG. 7.

Figure 6A:
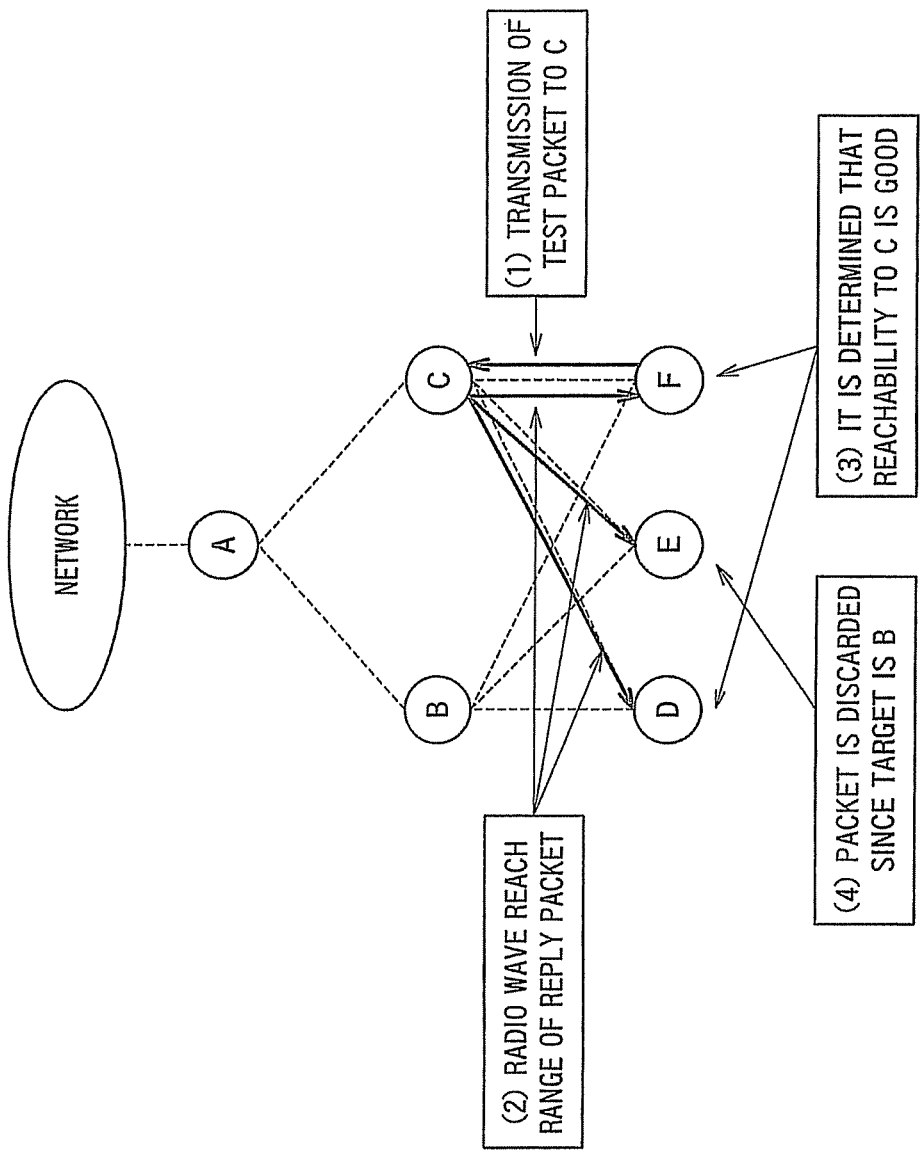
FIG. 6A is a diagram illustrating an operation according to a second embodiment.

Next, as illustrated in FIG. 6A, a case is considered in which the wireless station F transmits a reachability test packet to the wireless station C (S39). At this time, a destination address of the reachability test packet is the MAC address of the wireless station C and a transmission source address is the MAC address of the wireless station F. Next, the wireless station C receiving the reachability test packet replies to the reachability test reply packet to the wireless station F (S40). At this time, the destination address of the reachability test reply packet is the MAC address of the wireless station F and the transmission source address is the MAC address of the wireless station C.

Next, the reachability test reply packet is received by the wireless stations D, E, and F, since radio waves transmitted by the wireless station C can reach the wireless stations D, E, and F. At this time, the packet determining units 15 of the wireless stations D and F notify the reachability testing units 13 of the reception of the packets, since the transmission source addresses of the reachability test reply packets are identical with the address entries of FIG. 7 managed by the address managing units 14. Further, the packet determining unit 15 of the wireless station E discards the packet, since the transmission source address of the reachability test reply packet is not identical with the address entry of FIG. 7 managed by the address managing unit 14.

Since the wireless stations D and F receive the reachability test reply packet that matches the entry, the reachability testing units 13 each determine that the reachability to the wireless station C is good. The wireless station D cancels the execution of the reachability test at the period, since it is determined that the reachability to the wireless station C is good before the execution of the reachability test.

Figure 6B:
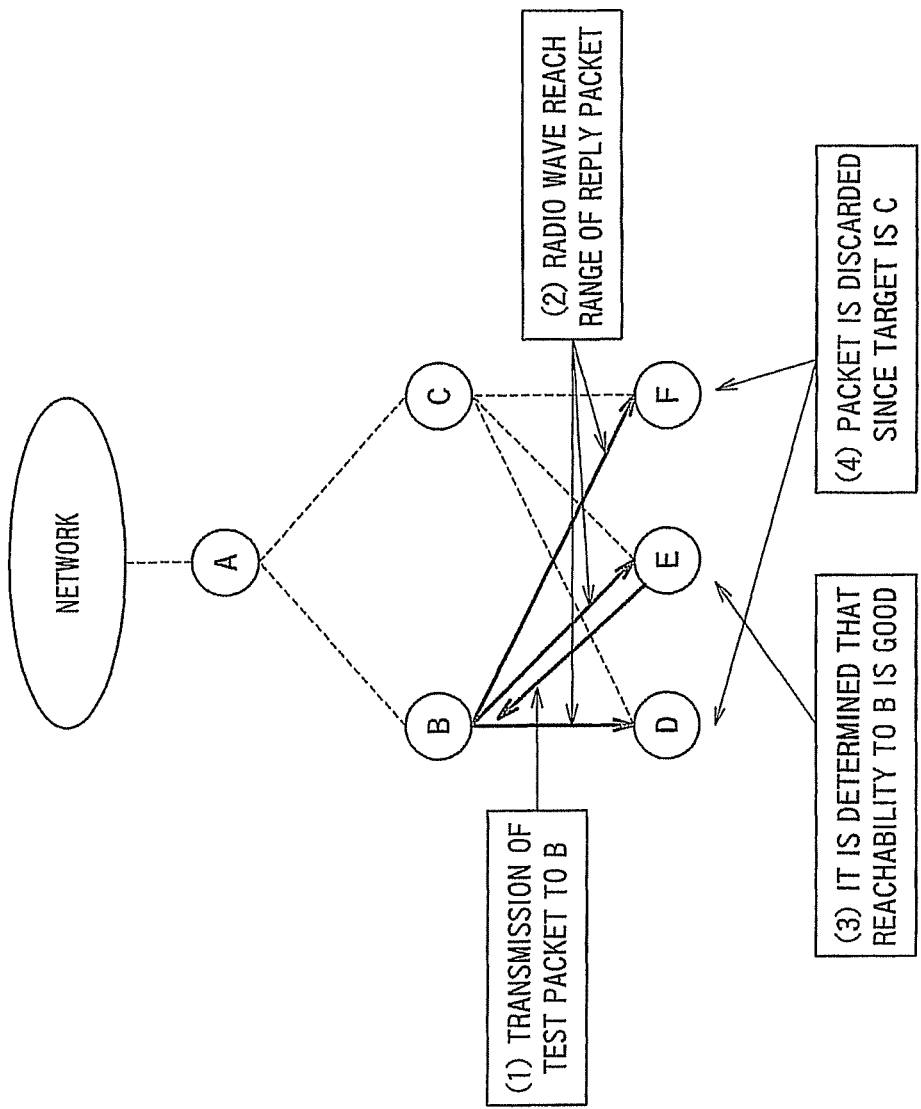
FIG. 6B is a diagram illustrating an operation according to the second embodiment.

Next, as illustrated in FIG. 6B, a case is considered in which the wireless station E transmits a reachability test packet to the wireless station B (S41). At this time, the destination address of the reachability test packet is the MAC address of the wireless station B and the transmission source address is the MAC address of the wireless station E. Next, the wireless station B receiving the reachability test packet replies to the reachability test replay packet to the wireless station E (S42). At this time, the destination address of the reachability test reply packet is the MAC address of the wireless station E and the transmission source address is the MAC address of the wireless station B.

Next, the reachability test reply packet is received by the wireless stations D, E, and F, since radio waves transmitted by the wireless station B can reach the wireless stations D, E, and F. At this time, the packet determining unit 15 of the wireless station E notifies the reachability testing unit 13 of the reception of the packet, since the transmission source address of the reachability test reply packet is identical with the address entry of FIG. 7 managed by the address managing unit 14. Further, the packet determining unit 15 of each of the wireless stations D and F discards the packet, since the transmission source address of the reachability test reply packet is not identical with the address entry of FIG. 7 managed by the address managing unit 14.

The reachability testing unit 13 is notified of the reachability test reply packet received by the wireless station E, and thus it is determined that the reachability to the wireless station B is good.

In the second embodiment, as described above, the case has been described in which the wireless station D changes the optimum route from the wireless station B to the wireless station C according to the RPL route control protocol, the wireless station F performs the reachability test on the wireless station C, and the wireless station E performs the reachability test on the wireless station B after the first embodiment. In this embodiment, the example has been described in which the execution of the reachability test is cancelled in response to the reception of the reachability test reply packet matching the address entry managed by the address managing unit 14. However, the embodiment is not limited to the reachability test reply packet. The execution of the reachability test may be cancelled in response to the reception of any packet, as long as the packet is a packet matching the address entry managed by the address managing unit 14. Further, the number of address entries managed by the address managing unit 14 is not necessarily limited to one, but a plurality of address entries may be registered. For example, when an alternative route is present in addition to the optimum route, both the address entries may be registered.

(Third Embodiment)

Hereinafter, a case will be described in which the wireless stations D, E, and F perform the reachability test on the wireless station A according to a third embodiment.

Figure 11:
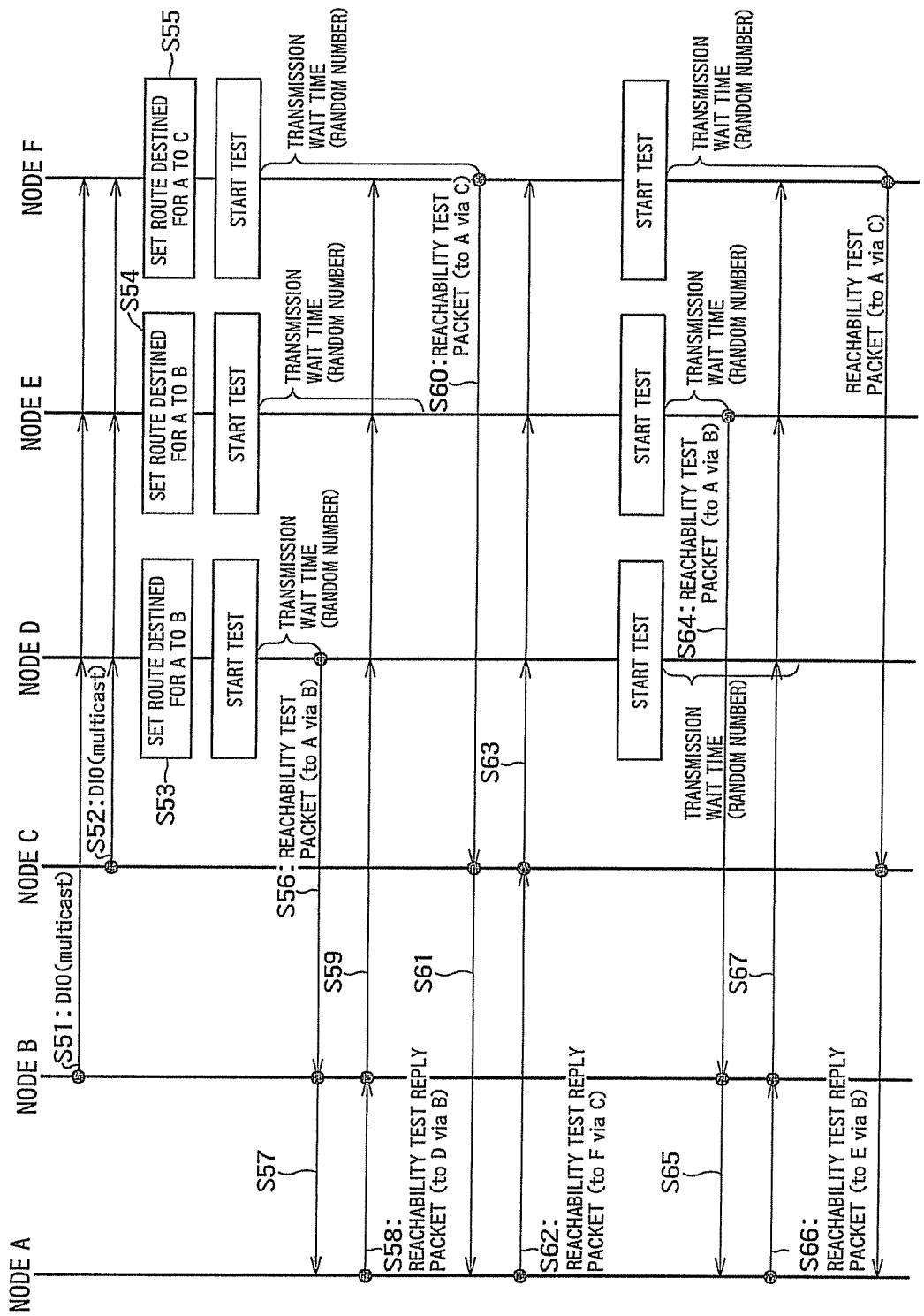
FIG. 11 is a diagram illustrating a sequence according to the third embodiment.

First, as illustrated in FIG. 11, in the initial state, it is assumed that according to an RPL route control protocol (S51 and S52), the wireless stations D and E select the wireless station B as an optimum route destined for the wireless station A and the wireless station F selects the wireless station C as an optimum route destined for the wireless station A (S53, S54, and S55). In the RPL, each node advertises an RPL DODAG information object (DIO) packet and a neighboring node receiving the RPL DIO manages the node as a candidate of the optimum route. Which route is selected as the optimum route is determined based on a metric (in this embodiment, a signal intensity and a packet retransmission ratio) monitored through the reachability test or the like. A priority (ranking value) of all the routes selected as candidates is calculated based on the metric. Therefore, the route having the smallest ranking value is selected as the optimum route according to a rule in which the higher the priority of the route is, the smaller the calculated ranking value is. In this embodiment, address entries managed by each of the address managing units 14 of the wireless stations D, E, and F are illustrated in FIG. 10. A filter determination address (1) illustrated in FIG. 10 refers to the address of the first hop node on an optimum route selected by the node. For example, a filter determination address (2) refers to the address of a border router (RPL DODAG Root node) which relays communication between a meshed network and a network 1, but the embodiment is not limited thereto. A relay node on an optimum route, a node within the meshed network, or a node on an external network may be used. An address stored in a DODAG ID field of the RPL DIO packet can be used as the address of the RPL DODAG Root node. The address in the filter determination address (2) may not be set according to the RPL route control protocol. For example, the address of a communication end point used for mounting in the application layer may be set.

Figure 9A:
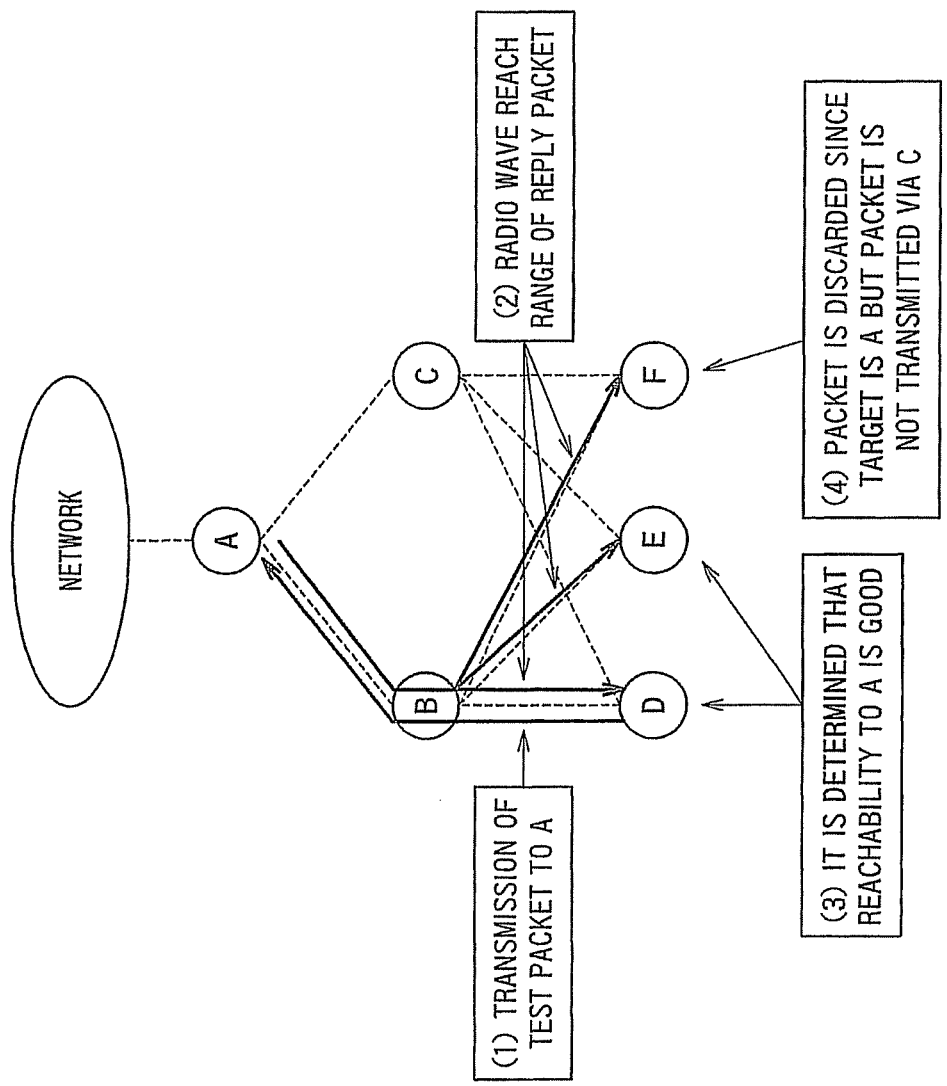
FIG. 9A is a diagram illustrating an operation according to a third embodiment.

First, as illustrated in FIG. 9A, a case is considered in which the wireless station D transmits a reachability test packet to the wireless station A via the wireless station B (S56). At this time, the destination IP address of the reachability test packet is the IP address of the wireless station A and a destination MAC address is the MAC address of the wireless station B. A transmission source IP address is the IP address of the wireless station D and a transmission source MAC address is the MAC address of the wireless station D. Next, the wireless station B receiving the reachability test packet transmits the reachability test packet to the wireless station A (S57). Next, the wireless station A receiving the reachability test packet relies to the reachability test reply packet to the wireless station D via the wireless station B (S58). Next, the wireless station B receiving the reachability test reply packet transmits the reachability test reply packet to the wireless station D (S59). At this time, the destination IP address of the reachability test reply packet is the IP address of the wireless station D and a destination MAC address is the MAC address of the wireless station D. The transmission source IP address is the IP address of the wireless station A and the transmission source MAC address is the MAC address of the wireless station B.

Next, the reachability test reply packet is received by the wireless stations D, E, and F, since radio waves transmitted by the wireless station B can reach the wireless stations D, E, and F At this time, the packet determining units 15 of the wireless stations D and E notify the reachability testing units 13 of the reception of the packets, since the transmission source addresses of the reachability test reply packets are identical with the address entries of FIG. 10 managed by the address managing units 14. Further, the packet determining unit 15 of the wireless station F discards the packet without notifying of the reception of the packet, since the transmission source address of the reachability test reply packet is not identical with the address entry of FIG. 10 managed by the address managing unit 14.

Since the wireless stations D and E receive the reachability test reply packet that matches the entry, the reachability testing units 13 each determine that the reachability to the wireless station A is good. The wireless station E cancels the execution of the reachability test at the period, since it is determined that the reachability to the wireless station A is good before the execution of the reachability test.

Figure 9B:
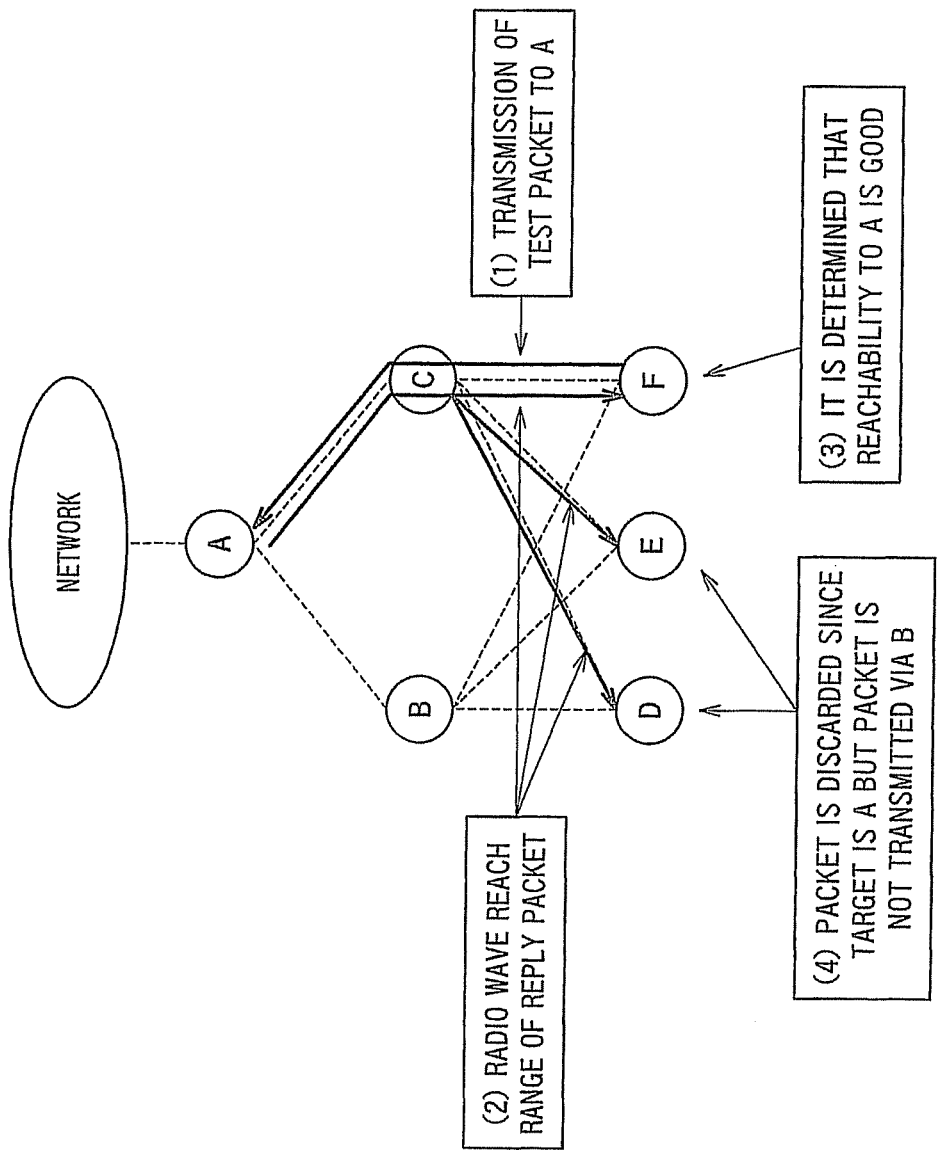
FIG. 9B is a diagram illustrating an operation according to the third embodiment.

Next, as illustrated in FIG. 9B, a case is considered in which the wireless station F transmits a reachability test packet to the wireless station A via the wireless station C (S60). At this time, the destination IP address of the reachability test packet is the IP address of the wireless station A and the destination MAC address is the MAC address of the wireless station C. Further, the transmission source IP address is the IP address of the wireless station F and the transmission source MAC address is the MAC address of the wireless station F. Next, the wireless station C receiving the reachability test packet transmits the reachability test packet to the wireless station A (S61). Next, the wireless station A receiving the reachability test packet replies to the reachability test reply packet to the wireless station F via the wireless station C (S62). Next, the wireless station C receiving the reachability test reply packet transmits the packet to the wireless station F (563). At this time, the destination IP address of the reachability test reply packet is the IP address of the wireless station F and the destination MAC address is the MAC address of the wireless station F. The transmission source IP address is the IP address of the wireless station A and the transmission source MAC address is the MAC address of the wireless station C.

Next, the reachability test reply packet is received by the wireless stations D, E, and F, since radio waves transmitted by the wireless station C can reach the wireless stations D, E, and F. At this time, the packet determining unit 15 of the wireless station F notifies the reachability testing unit 13 of the reception of the packet, since the transmission source address of the reachability test reply packet is identical with the address entry of FIG. 10 managed by the address managing unit 14. Further, the packet determining units 15 of the wireless stations D and E discard the packet without notifying of the reception of the packet, since the transmission source address of the reachability test reply packet is not identical with the address entry of FIG. 10 managed by the address managing unit 14.

Since the wireless station F receives the reachability test reply packet that matches the entry, the reachability testing unit 13 of the wireless station F determines that the reachability to the wireless station A is good.

Figure 9C:
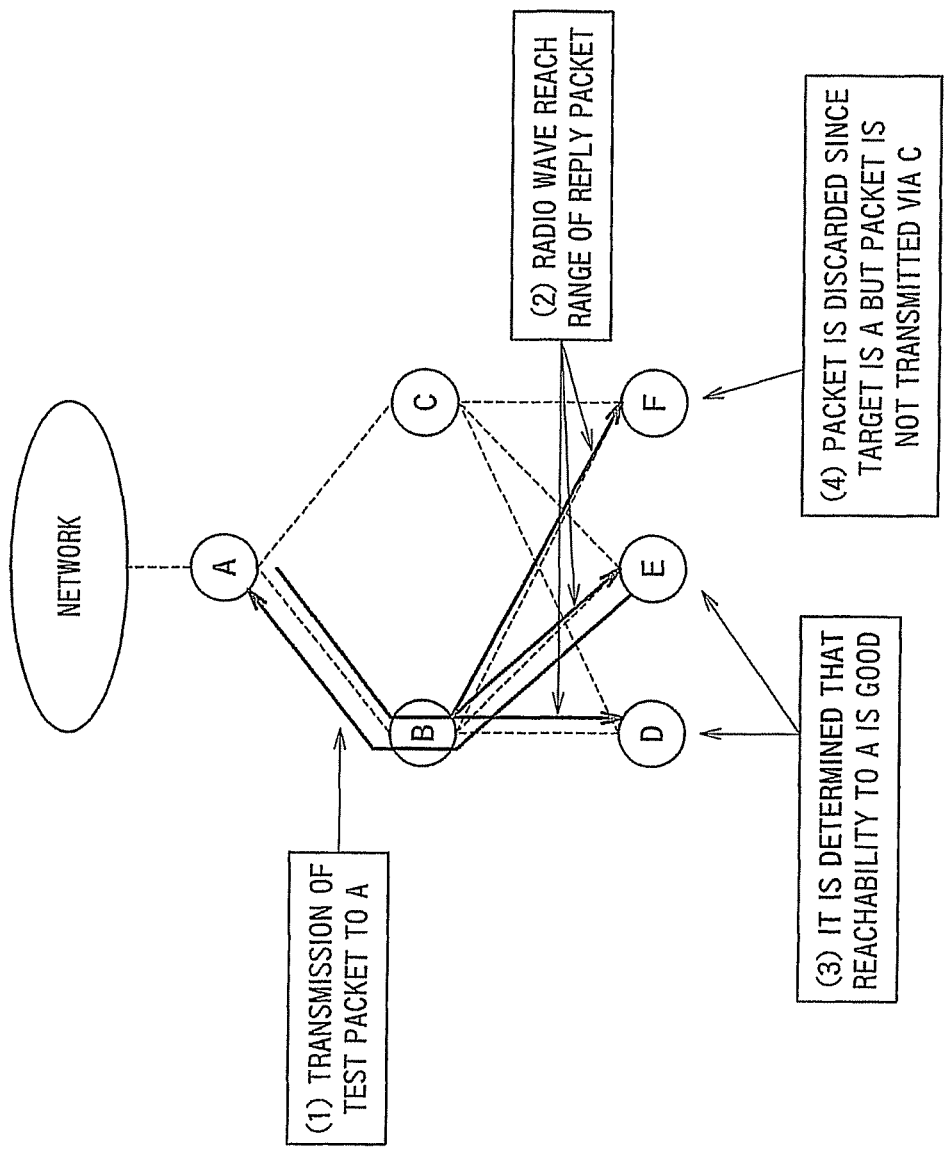
FIG. 9C is a diagram illustrating an operation according to the third embodiment.

Next, as illustrated in FIG. 9C, a case is considered in which the wireless station E transmits the reachability test packet to the wireless station A via the wireless station B (S64). At this time, the destination IP address of the reachability test packet is the IP address of the wireless station A and the destination MAC address is the MAC address of the wireless station B. Further, the transmission source IP address is the IP address of the wireless station E and the transmission source MAC address is the MAC address of the wireless station E. Next, the wireless station B receiving the reachability test packet transmits the reachability test packet to the wireless station A (S65). Next, the wireless station A receiving the reachability test packet replies to the reachability test reply packet to the wireless station E via the wireless station B (S66). Next, the wireless station B receiving the reachability test reply packet transmits the reachability test reply packet to the wireless station E (S67). At this time, the destination IP address of the reachability test reply packet is the IP address of the wireless station E and the destination MAC address is the MAC address of the wireless station E. The transmission source IP address is the IP address of the wireless station A and the transmission source MAC address is the MAC address of the wireless station B.

Next, the reachability test reply packet is received by the wireless stations D, E, and F, since radio waves transmitted by the wireless station B can reach the wireless stations D, E, and F. At this time, the packet determining units 15 of the wireless stations D and E notify the reachability testing units 13 of the reception of the packet, since the transmission source address of the reachability test reply packet is identical with the address entry of FIG. 10 managed by the address managing unit 14. Further, the packet determining unit 15 of the wireless station F discards the packet without notifying of the reception of the packet, since the transmission source address of the reachability test reply packet is not identical with the address entry of FIG. 10 managed by the address managing unit 14.

Since the wireless stations D and E receive the reachability test reply packet that matches the entry, the reachability test reply packet 13 determines that the reachability to the wireless station A is good. The wireless station D cancels the execution of the reachability test at the period, since it is determined that the reachability to the wireless station A is good before the execution of the reachability test.

In the third embodiment, the case has hitherto been described in which the wireless stations D, E, and F perform the reachability test on the wireless station A. In this embodiment, the example has been described in which the execution of the reachability test is cancelled in response to the reception of the reachability test reply packet matching the address entry managed by the address managing unit 14. However, the embodiment is not limited to the reachability test reply packet. The execution of the reachability test may be cancelled in response to the reception of any packet, as long as the packet is a packet matching the address entry managed by the address managing unit 14. Further, the filter determination addresses (1) and (2) managed by the address managing unit 14 are each not necessarily limited to one address entry, but a plurality of address entries may be registered. For example, when an alternative route is present in addition to the optimum route, both the address entries may be registered. Further, a wild card value indicating any address as an address entry may be registered.

(Fourth Embodiment)

In a fourth embodiment, a case will be described in which the wireless station D changes the optimum route from the wireless station B to the wireless station C according to the RPL route control protocol, the wireless stations F and E perform a reachability test on the wireless station A after the third embodiment.

Figure 13:
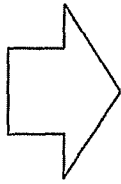
FIG. 13 is a diagram illustrating an example of a filter determination address according to the fourth embodiment.
Figure 14:
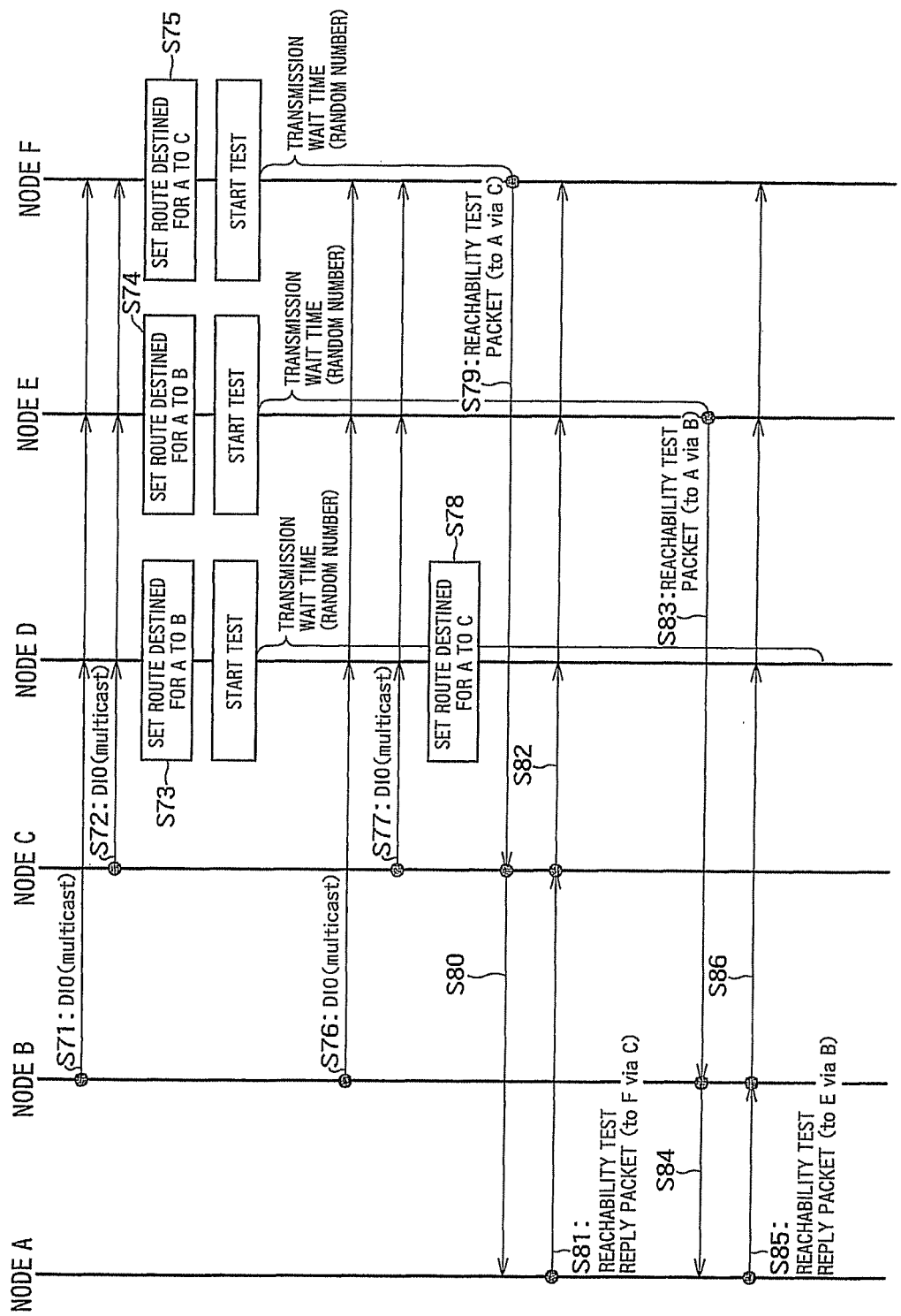
FIG. 14 is a diagram illustrating a sequence according to the fourth embodiment.

First, as illustrated in FIG. 14, in the initial state, it is assumed that according to an RPL route control protocol (S71 and S72), the wireless stations D and E select the wireless station B as an optimum route and the wireless station F selects the wireless station C as an optimum route as the result of the third embodiment (S73, S74, and S75). Next, the wireless station D receives RPL DIO packets from the wireless stations B and C again (S76 and S77). At this time, it is assumed that the wireless station D recalculates a priority (ranking value) of the routes to the wireless stations B and C and resets the wireless station C as the optimum route (S78). Accordingly, the address entries managed by the address managing unit 14 of each of the wireless stations D, E, and F are illustrated in FIG. 13.

Figure 12A:
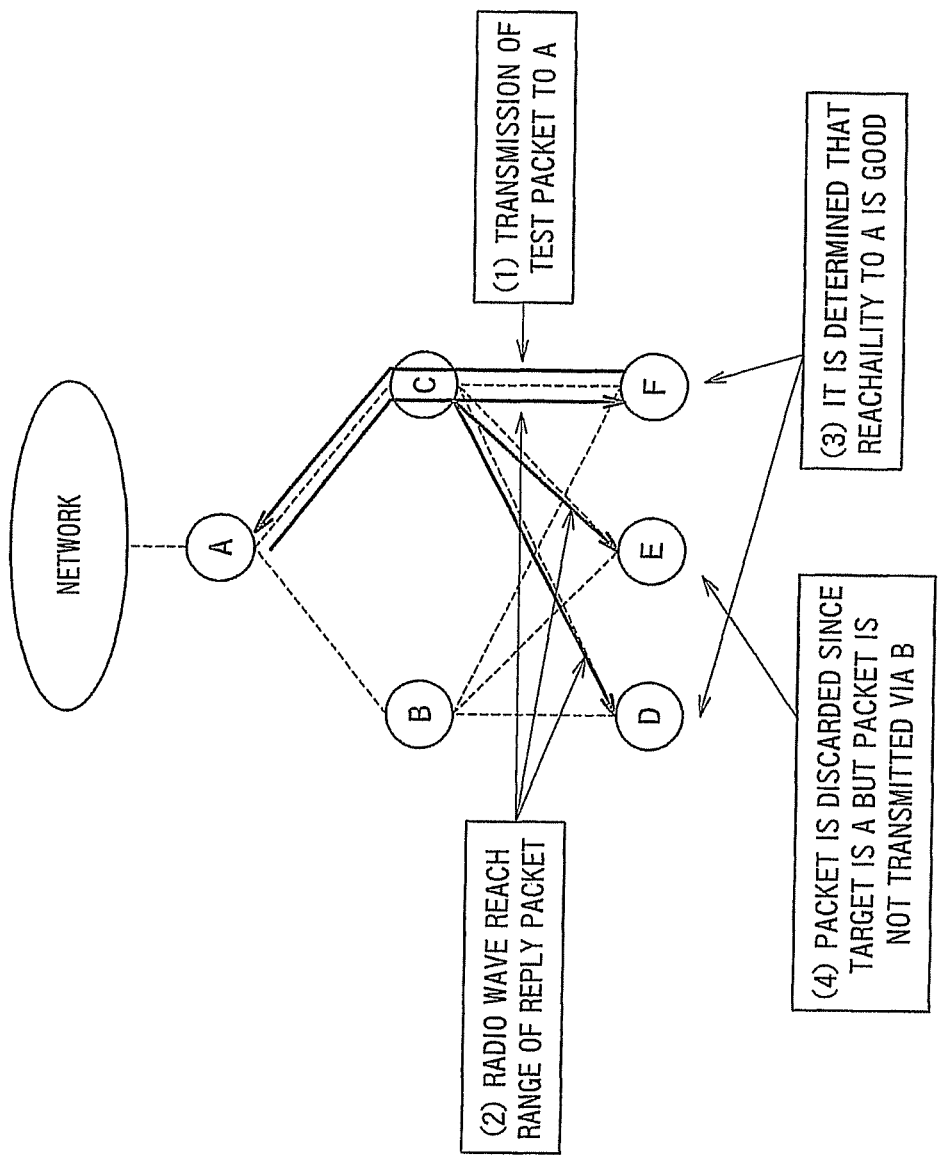
FIG. 12A is a diagram illustrating an operation according to a fourth embodiment.

First, as illustrated in FIG. 12A, a case is considered in which the wireless station F transmits a reachability test packet to the wireless station A via the wireless station C (S79). At this time, the destination IP address of the reachability test packet is the IP address of the wireless station A and the destination MAC address is the MAC address of the wireless station C. The transmission source IP address is the IP address of the wireless station F and the transmission source MAC address is the MAC address of the wireless station F. Next, the wireless station C receiving the reachability test packet transmits the reachability test packet to the wireless station A (S80). Next, the wireless station A receiving the reachability test packet replies to the reachability test reply packet to the wireless station F via the wireless station C (S81). Next, the wireless station C receiving the reachability test reply packet transmits the reachability test reply packet to the wireless station F (S82). At this time, the destination IP address of the reachability test reply packet is the IP address of the wireless station F and the destination MAC address is the MAC address of the wireless station F. Further, the transmission source IP address is the IP address of the wireless station A and the transmission source MAC address is the MAC address of the wireless station C.

Next, the reachability test reply packet is received by the wireless stations D, E, and F, since radio waves transmitted by the wireless station C can reach the wireless stations D, E, and F. At this time, the packet determining units 15 of the wireless stations D and F notify the reachability testing units 13 of the reception of the packets, since the transmission source addresses of the reachability test reply packets are identical with the address entries of FIG. 13 managed by the address managing units 14. Further, the packet determining unit 15 of the wireless station E discards the packet without notifying of the reception of the packet, since the transmission source address of the reachability test reply packet is not identical with the address entry of FIG. 13 managed by the address managing unit 14.

Since the wireless stations D and F receive the reachability test reply packet that matches the entry, each reachability test reply packet 13 determines that the reachability to the wireless station A is good. The wireless station D cancels the execution of the reachability test at the period, since it is determined that the reachability to the wireless station A is good before the execution of the reachability test.

Figure 12B:
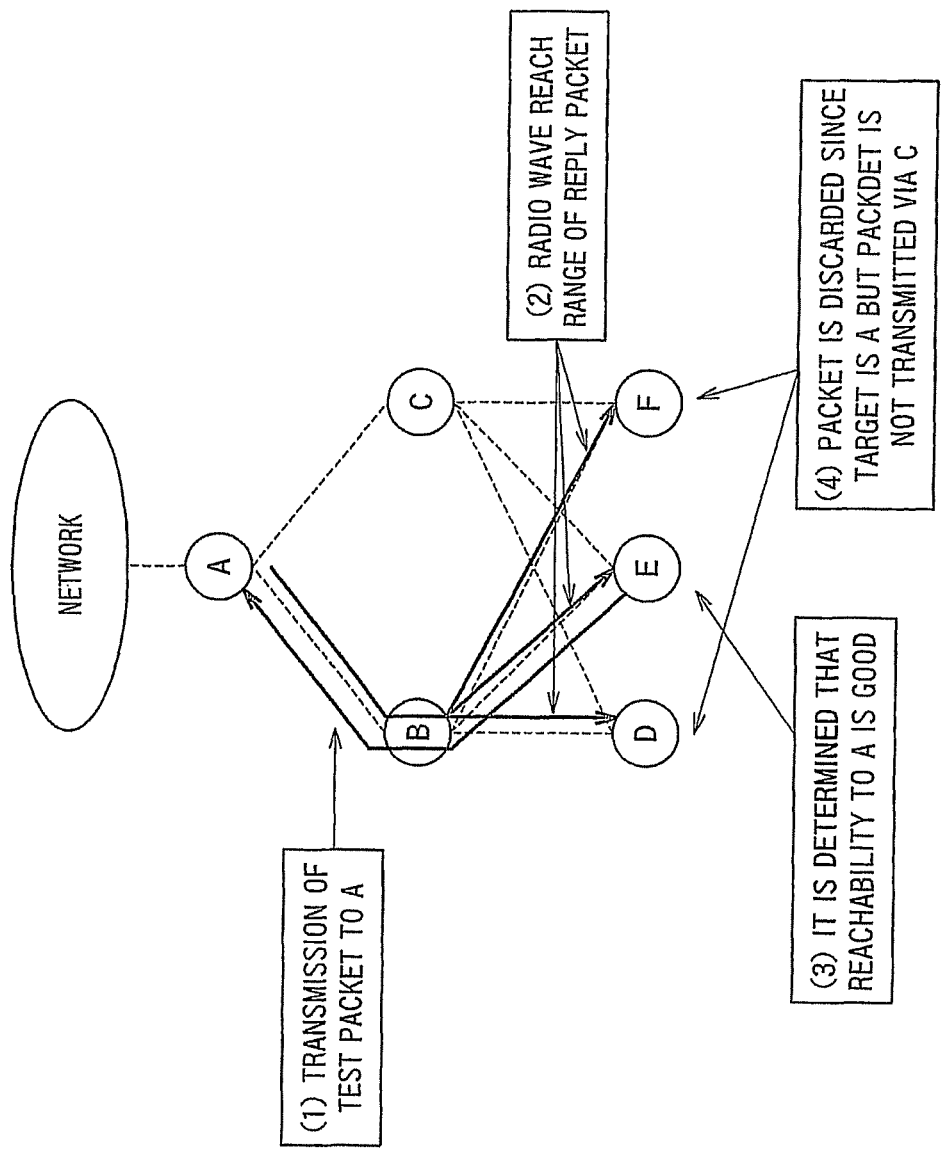
FIG. 12B is a diagram illustrating an operation according to the fourth embodiment.

Next, as illustrated in FIG. 12B, a case is considered in which the wireless station E transmits a reachability test packet to the wireless station A via the wireless station B (S83). At this time, the destination IP address of the reachability test packet is the IP address of the wireless station A and the destination MAC address is the MAC address of the wireless station B. Further, the transmission source IP address is the IP address of the wireless station E and the transmission source MAC address is the MAC address of the wireless station E. Next, the wireless station B receiving the reachability test packet transmits the reachability test packet to the wireless station A (S84). Next, the wireless station A receiving the reachability test packet replies to the reachability test reply packet to the wireless station E via the wireless station B (S85). Next, the wireless station B receiving the reachability test reply packet transmits the reachability test reply packet to the wireless station E (S86). At this time, the destination IP address of the reachability test reply packet is the IP address of the wireless station E and the destination MAC address is the MAC address of the wireless station E. Further, the transmission source IP address is the IP address of the wireless station A and the transmission source MAC address is the MAC address of the wireless station B.

Next, the reachability test reply packet is received by the wireless stations D, E, and F, since radio waves transmitted by the wireless station B can reach the wireless stations D, E, and F. At this time, the packet determining unit 15 of the wireless station E notifies the reachability testing unit 13 of the reception of the packet, since the transmission source address of the reachability test reply packet is identical with the address entry of FIG. 13 managed by the address managing unit 14. Further, the packet determining unit 15 of each of the wireless stations D and F discards the packet without notifying of the reception of the packet, since the transmission source address of the reachability test reply packet is not identical with the address entry of FIG. 4 managed by the address managing unit 14.

Since the wireless station E receives the reachability test reply packet that matches the entry, the reachability test reply packet 13 of the wireless station E determines that the reachability to the wireless station A is good.

In the fourth embodiment, as described above, the case has been described in which the wireless station D changes the optimum route from the wireless station B to the wireless station C according to the RPL route control protocol and the wireless stations F and E perform the reachability test on the wireless station A, after the third embodiment. In this embodiment, the example has been described in which the execution of the reachability test is cancelled in response to the reception of the reachability test reply packet matching the address entry managed by the address managing unit 14. However, the embodiment is not limited to the reachability test reply packet. The execution of the reachability test may be cancelled in response to the reception of any packet, as long as the packet is a packet matching the address entry managed by the address managing unit 14. Further, the filter determination addresses (1) and (2) managed by the address managing unit 14 are each not necessarily limited to one address entry, but a plurality of address entries may be registered. For example, when an alternative route is present in addition to the optimum route, both the address entries may be registered. Further, a wild card value indicating any address as an address entry may be registered.

The invention claimed is:

1. A communication station comprising:
a receiving unit, implemented by a processor, configured to receive a packet from a network in which a plurality of communication stations are wirelessly interconnected;
a determining unit, implemented by the processor, configured to determine whether the receiving unit receives a first packet in which a transmission source is an address of a first communication station and a transmission destination address is an address of another communication station different from the first communication station among the plurality of communication stations;
a transmitting unit, implemented by the processor, configured to transmit a reply request packet to request a reply to the first communication station; and
a reachability testing unit, implemented by the processor, configured to control so that the transmitting unit does not transmit the reply request packet when it is determined that the first packet has been received before a predetermined timing and transmits the reply request packet when it is determined that the first packet has not been received before the predetermined timing.

2. The communication station according to claim 1, further comprising:
a route control unit, implemented by the processor, configured to perform route control of the network in conformity of a route control protocol to set an optimum route,
wherein the first communication station is an adjacent communication station on the optimum route set by the route control unit.

3. The communication station according to claim 2, further comprising:
a table storing a MAC address of the first communication station,
wherein when the adjacent communication station is changed from the first communication station to another communication station, the route control unit changes the MAC address stored in the table to a MAC address of the other communication station.

4. The communication station according to claim 1,
wherein a second communication station which performs relay is disposed between the communication station and the first communication station,
wherein the determining unit determines whether the receiving unit receives a second packet in which a transmission source IP address is the address of the first communication station and a transmission source MAC address is a MAC address of the second communication station, and
wherein the reachability testing unit omits transmitting the reply request via the packet transmitting unit when the second packet is received before the transmitting unit transmits the reply request packet.

5. The communication station according to claim 4, wherein a destination address of the second packet is the an address of said another communication station different from the first and second communication stations among the plurality of communication stations.

6. The communication station according to claim 4, further comprising:
a route control unit, implemented by the processor, configured to perform route control of the network in conformity of a route control protocol to set an optimum route to the first communication station,
wherein the second communication station is an adjacent communication station on the optimum route to the first communication station.

7. The communication station according to claim 6, further comprising:
a table configured to store the MAC address of the second communication station and the IP address of the first communication station,
wherein when the adjacent communication station is changed from the second communication station to another communication station, the route control unit changes the MAC address stored in the table to a MAC address of the other communication station.

8. The communication station according to claim 1, wherein the transmitting unit transmits the reply request packet at a periodic timing or after a time generated by a random number from the periodic timing.

9. A non-transitory computer readable medium having instructions stored therein, which when executed by the processor, causes the processor to execute steps comprising:
receiving a packet from a network in which a plurality of communication stations are wirelessly interconnected;
determining whether a first packet has been received in which a transmission source address is an address of a first communication station and a transmission destination address is an address of another communication station different from the first communication station among the plurality of communication stations; and transmitting a reply request packet to request a reply to the first communication station when it is determined that the first packet has not been received before a predetermined timing and not transmitting the reply request packet to the first communication station when it is determined that the first packet has been received before the predetermined timing.

10. A communication network system in which a plurality of communication stations including a first communication station and a second communication station are wirelessly interconnected, wherein:

the first communication station transmits a reply request packet to request a reply to the second communication station; and the second communication station transmits a reply packet corresponding to the reply request packet to the first communication station;

wherein the first communication station determines whether a first packet has been received in which a transmission source address is an address of the second communication station and a transmission destination address is an address of another communication station different from the second communication station among the plurality of communication stations; and the first communication station does not transmit the reply request packet to the second communication station when the first communication station determines that the first packet has been received before a predetermined timing; and the first communication transmits the reply request packet to the second communication station when the first communication station determines that the first packet has not been received before the predetermined timing.

* * * * *